US011195425B2

(12) United States Patent
Barth et al.

(10) Patent No.: US 11,195,425 B2
(45) Date of Patent: Dec. 7, 2021

(54) SYSTEMS AND METHODS FOR DELIVERING VEHICLE-SPECIFIC EDUCATIONAL CONTENT FOR A CRITICAL EVENT

(71) Applicant: Allstate Insurance Company, Northbrook, IL (US)

(72) Inventors: Kim Alan Barth, Northbrook, IL (US); Robert Stroh, Woodstock, IL (US)

(73) Assignee: Allstate Insurance Company, Northbrook, IL (US)

( * ) Notice: Subject to any disclaimer, the term of this patent is extended or adjusted under 35 U.S.C. 154(b) by 177 days.

(21) Appl. No.: 16/541,443

(22) Filed: Aug. 15, 2019

(65) Prior Publication Data
US 2021/0049920 A1    Feb. 18, 2021

(51) Int. Cl.
*G09B 5/02* (2006.01)
*G06F 3/0482* (2013.01)
(Continued)

(52) U.S. Cl.
CPC ............ *G09B 5/02* (2013.01); *G06F 3/0482* (2013.01); *G06F 40/216* (2020.01);
(Continued)

(58) Field of Classification Search
CPC ....... G09B 5/02; G06F 40/216; G06F 3/0482; G06Q 30/0271; G07C 5/008; H04L 67/12
(Continued)

(56) References Cited

U.S. PATENT DOCUMENTS 6,810,406 B2    10/2004  Schlabach et al.
8,977,423 B2     3/2015  Merg et al.
(Continued)

FOREIGN PATENT DOCUMENTS

CN    106022619 A    10/2016
CN    106096739 A    11/2016
(Continued)

OTHER PUBLICATIONS

"ALLDATA Repair—OEM Automotive Mechanical Repair Information" http://www.alldata.com/alldata-repair website visited Oct. 3, 2018, pp. 1-4.
(Continued)

*Primary Examiner* — William D Titcomb
(74) *Attorney, Agent, or Firm* — Polsinelli PC

(57) ABSTRACT

Systems and methods are disclosure for using sensors to deliver educational content to vehicle users during critical events. One method comprises: receiving, by a first computing device having at least one processor and from a user device of a vehicle user via a wireless data connection, a notification of a critical event for a vehicle of the vehicle user and a vehicle identification of the vehicle; receiving, from the user device via the first wireless data connection, user input soliciting educational content to remedy the critical event; determining, based on the received user input, a first set of search parameters; for each of the search parameters in the first set of search parameters, selecting educational content for a first list of educational content from a second list of educational content; and displaying, on the user device, the first list of educational content based on the first set of search parameters.

20 Claims, 4 Drawing Sheets

(51) Int. Cl.
*G07C 5/00* (2006.01)
*H04L 29/08* (2006.01)
*G06Q 30/02* (2012.01)
*G06F 40/216* (2020.01)

(52) U.S. Cl.
CPC ......... *G06Q 30/0271* (2013.01); *G07C 5/008* (2013.01); *H04L 67/12* (2013.01)

(58) Field of Classification Search
USPC ........................................................ 434/305
See application file for complete search history.

(56) References Cited

U.S. PATENT DOCUMENTS

| | | | |
|---|---|---|---|
| 9,472,028 B2 | 10/2016 | Abdel-Rahman et al. | |
| 9,513,789 B2* | 12/2016 | Marshall | G07C 5/008 |
| 9,665,994 B1 | 5/2017 | Merg et al. | |
| 9,979,612 B2 | 5/2018 | Kondo et al. | |
| 10,242,510 B2* | 3/2019 | Merg | G06F 16/252 |
| 10,331,687 B2* | 6/2019 | Merg | G07C 5/006 |
| 10,909,777 B2* | 2/2021 | Covington | G06Q 50/30 |
| 2003/0171111 A1* | 9/2003 | Clark | H04L 67/10 455/414.1 |
| 2003/0216936 A1 | 11/2003 | Saitoh et al. | |
| 2013/0204797 A1 | 8/2013 | Kleinschmidt et al. | |
| 2016/0104124 A1 | 4/2016 | Bullock | |
| 2017/0098200 A1 | 4/2017 | Merg et al. | |
| 2017/0344958 A1 | 11/2017 | Lumera et al. | |
| 2017/0372532 A1* | 12/2017 | Merg | G07C 5/085 |
| 2019/0050458 A1* | 2/2019 | Merg | G06F 16/2471 |
| 2020/0134933 A1* | 4/2020 | Covington | G07C 5/008 |

FOREIGN PATENT DOCUMENTS

| | | |
|---|---|---|
| CN | 106289800 A | 1/2017 |
| CN | 107341980 A | 11/2017 |
| DE | 102014114204 A1 | 3/2016 |

OTHER PUBLICATIONS

"RE'FLEKT: Range Rover Repair Faster with AR" https://www.re-flekt.com/portfolio-item/range-rover-augmented-reality-complex-repairs website visited Oct. 3, 2018, pp. 1-7.

Hugo Alvarez et al. "Providing Guidance for Maintenance Operations Using Automatic Markerless Augmented Reality System" IEEE International Symposium on Mixed and Augmented Reality 2011 Science and Technology Proceedings Oct. 26-29, Basel, Switzerland https://www.ceit.es/images/stories/files/pdf/Mechanics/paper%20hugo%20alvarez.pdf pp. 1-10.

"Free Videos on Auto Repair" Crawfords Auto Repair https://crawfordsautoservice.com/free_videos/#.W7TC8eTrtkc website visited Oct. 3, 2018, pp. 1-3.

\* cited by examiner

SYSTEMS AND METHODS FOR DELIVERING VEHICLE-SPECIFIC EDUCATIONAL CONTENT FOR A CRITICAL EVENT

TECHNICAL FIELD

Aspects of the disclosure generally relate to sensors and the analysis of vehicular conditions obtained from sensors. In particular, various aspects of the disclosure include a framework for delivering vehicle-specific educational content for a critical event.

BACKGROUND

Vehicle users may often face vehicle breakdowns, vehicle maintenance issues, and other critical events that may need a vehicle repair or roadside assistance. Often, vehicle users are uninformed about vehicle repair, or inexperienced to perform self-diagnosis or treatment of a vehicle during a critical event. Furthermore, roadside assistance may be costly and inefficient, or unavailable in certain locations and times. When there is roadside assistance, a vehicle mechanic or repair personnel may not necessarily understand how to diagnose or repair a specific type of vehicle, and may need vehicle-specific information to assist in the vehicle's recovery.

There is thus a desire for a system, method, and computer readable medium for delivering educational content that is specific to a vehicle during critical events. Furthermore, there is a need for a system to more precisely match relevant educational content based on input delivered manually or automatically from vehicle systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for delivering vehicle-specific educational content for a critical event.

One method may comprise: receiving, by a first computing device having at least one processor and from a user device of a vehicle user via a wireless data connection, a notification of a critical event for a vehicle of the vehicle user and a vehicle identification of the vehicle; receiving, by the first computing device and from the user device via the first wireless data connection, user input soliciting educational content to remedy the critical event; determining, by the first computing device and based on the received user input, a first set of search parameters, wherein a search parameter alters the selection of educational content by the first computing device; for each of the search parameters in the first set of search parameters, altering a selection of educational content into a first list of educational content from a second list of educational content; and displaying, on the user device by the first computing device, the first list of educational content based on the first set of search parameters.

The method may further comprise: receiving, by the computing device, vehicle-specific information based on the vehicle identification; determining, by the computing device and based on the received vehicle-specific information, an additional set of search parameters; for each of the search parameters in the first set of search parameters, further altering the selection of educational content into the first list of educational content from the second list of educational content; and displaying, on the user device by the first computing device, the first list of educational content based on the first set and the additional set of search parameters.

In accordance with other embodiments of the present disclosure, a system comprises: one or more processors; and memory storing computer-executable instructions that, when executed by the one or more processors, cause the system to: receive, from a user device of a vehicle user via a wireless data connection, a notification of a critical event for a vehicle of the vehicle user and a vehicle identification of the vehicle; receive, from the user device via the first wireless data connection, user input soliciting educational content associated with the critical event; determine, based on the received user input, a first set of search parameters; for each of the search parameters in the first set of search parameters, select educational content for a first list of educational content from a second list of educational content, wherein the first list of educational content is a subset of the second list of educational content; and display, on the user device, the first list of educational content based on the first set of search parameters.

In accordance with further aspects of the present disclosure, non-transitory computer readable media are disclosed for storing a program causing a computing device having at least one processor to execute a method. One method may comprise: receiving, from a user device of a vehicle user via a wireless data connection, a notification of a critical event for a vehicle of the vehicle user and a vehicle identification of the vehicle; receiving, from the user device via the first wireless data connection, user input soliciting educational content associated with the critical event; determining, based on the received user input, a first set of search parameters; for each of the search parameters in the first set of search parameters, selecting educational content for a first list of educational content from a second list of educational content, wherein the first list of educational content is a subset of the second list of educational content; and displaying, on the user device, the first list of educational content based on the first set of search parameters.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

An educational content may impart information aimed to assist a vehicle user in overcoming a critical event. A critical event may refer to a vehicle breakdown, malfunction, maintenance issue, or any other event that may involve a repair or attendance. The educational content may be in one or more multimedia forms (e.g., audios, videos, images, documents, guides, presentations, or a combination thereof).

Figure 1:
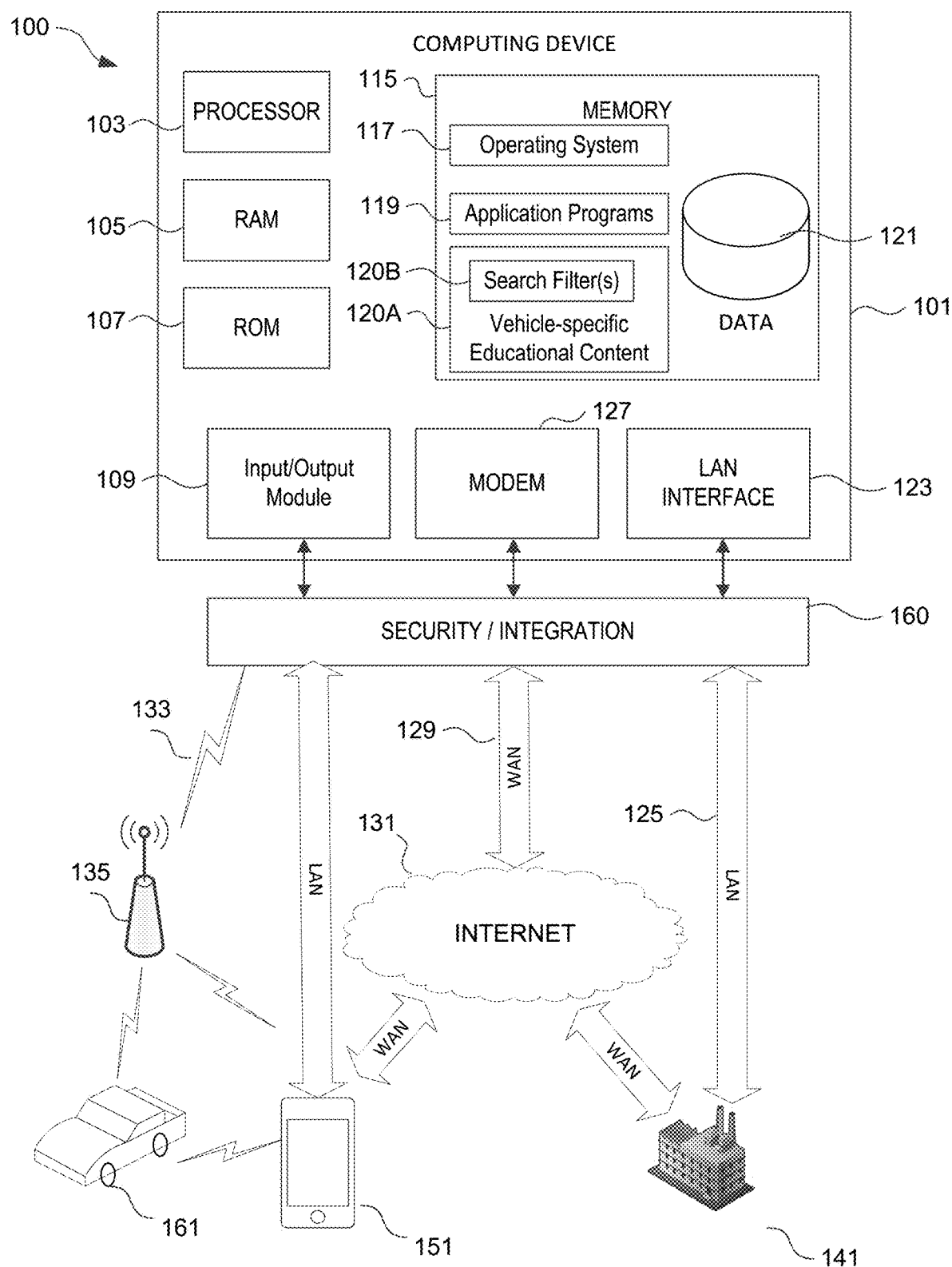
FIG. 1 illustrates a network environment and computing systems that may be used to implement aspects of the disclosure.

FIG. 1 illustrates a block diagram of a computing device, server, or system 101 in communication system 100 that may be used according to one or more illustrative embodiments of the disclosure. For example, a computing device, server, or system (e.g., "educational content system," "educational content device," "computing system," "computing device," etc.) may receive notifications from a user device (e.g., of a vehicle user) of critical events and requests soliciting educational content to help the vehicle user overcome the critical event. Furthermore, the educational content can determine appropriate educational content and/or search filters for determining appropriate educational content based on received user input, and vehicle-specific information received from a user device, a vehicle system, and/or other external systems.

The computing device 101 may have a processor 103 for controlling overall operation of the computing device 101 and its associated components, including RAM 105, ROM 107, input/output module 109, and memory 115. The computing device 101, along with one or more additional devices (e.g., terminals 141, 151, 161) may correspond to any of multiple systems or devices. For example, wireless computing devices 151 (e.g., user devices, vehicle user devices) may be configured as described herein for sending requests for, and receiving, educational content, and providing user input pertaining to the requests for educational content. In one or more aspects, the wireless computing devices 151 could be configured to receive and send data obtained from sensors within (e.g., camera, infrared sensor, gyroscope, etc.). Terminal devices may further include computing systems of vehicles 161 (e.g., telematics servers, vehicle on board diagnostics (OBD) servers, etc.), configured as described herein for receiving vehicle data gathered from sensors in vehicles 161 and presenting the data to relevant parties, including educational content system 101. Terminal devices may further include computing systems of third parties 141. For example, computing systems of vehicle manufacturers and/or dealers 141 may be able to provide vehicle-specific information that the educational content system 101 may use to determine appropriate educational content and/or search filters for educational content to be delivered to the vehicle user. Alternatively or additionally, computing systems from vehicle manufacturers and/or dealers 141 may periodically update or add on to a repository of educational content present in the educational content system 101.

Input/Output (I/O) 109 may include, for example, a microphone, keypad, touch screen, and/or stylus through which a user of the computing device 101 may provide input, and may also include one or more of a speaker for providing audio output and a video display device for providing textual, audiovisual and/or graphical output. In some embodiments, computing device 101 may itself be a user device used by a user to initiate a request for educational content to assist the user during a critical event, whereby input/output (I/O) 109 may be used to enter relevant information (e.g., user input for a computing device 101 that is a user device 151), or send or view relevant educational content (e.g., for a user device 151 or educational content system 101, respectively). In such embodiments, the user device may be equipped with various sensors described herein (e.g., camera, infrared sensor, gyroscope, etc.) to obtain any further information the educational content system 101 may need to determine relevant educational content. Alternatively or additionally, this user device 101 may have in-built hardware designed to perform various methods described in the present disclosure, and may be carried by the user.

Software may be stored within memory 115 and/or storage to provide instructions to processor 103 for enabling device 101 to perform various functions. For example, memory 115 may store a repository or a substantially complete list of educational content 120A. This repository or list 120A may be periodically updated via communications with external systems (e.g., computing systems of vehicle manufacturers and/or dealers 141, educational content providers, etc.). For example, updates to the repository or list 120A may be completed with the partnership of the vehicle manufacturer based on their recommendations and procedures. Alternatively or additionally, memory 115 may store search parameters or filters (e.g., search filter(s) 120B) that categorize or otherwise organize the repository or list of educational content 120A. Search filter(s) 120B may also be periodically updated based on the updating of the list or repository 120A.

Furthermore, memory 115 may store software used by the device 101, such as an operating system 117, any application programs 119 (e.g., machine learning algorithms), and an associated internal database 121. Processor 103 and its associated components may allow the educational content system 101 to execute a series of computer-readable instructions to receive a request from a wireless computing device 141 of a user for educational content, establish connections with sensors found in terminals 141, 151, 161, obtain vehicle-specific data (including but not limited to, quantifiable data, image data, video data, sound data, and/or movement data) from sensors that can determine conditions of one or more vehicle features, perform an analysis based on received user input and data, and determine relevant educational content or search parameters for educational content.

The educational content system 101 may operate in a networked environment 100 supporting connections to one or more remote computers, such as terminals 141 151, and 161. The terminals 141, 151, and 161 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the educational content system 101. The network connections depicted in FIG. 1 include a local area network (LAN) 125 and a wide area network (WAN) 129, and a wireless telecommunications network 133, but may also include other networks. When used in a LAN networking environment, the educational content system 101 may be connected to the LAN 125 through a network interface or adapter 123. When used in a WAN networking environment, the computing system 101 may include a modem 127 or other means for establishing communications over the WAN 129, such as network 131 (e.g., the Internet). When used in a wireless telecommunications network 133, the computing system 101 may include one or more transceivers, digital signal processors, and additional circuitry and software for communicating with wireless computing devices 151 (e.g., mobile phones, user devices of vehicle users, etc.) and vehicle systems 141 (e.g., telematics devices, on board diagnostic systems, global positioning systems (GPS), etc.) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, LTE, is presumed, and the various computing devices described herein may be configured to communicate using any of these network protocols or technologies. In some embodiments, for example, where the computing device 101 is of a user device 151, the network connections may facilitate a connection and communication with a vehicle 161 using short range communication technologies 137 (e.g., Bluetooth, NFC, etc. 137)

Additionally, one or more application programs 119 used by the educational content server/system 101 may include computer executable instructions (e.g., machine learning based algorithms) for: receiving a notification or request for educational content from a wireless computing device 151 of a user; establishing connections with sensors found in terminals 141, 151, 161; receiving vehicle conditions data (including but not limited to, quantifiable data, image data, video data, sound data, and/or movement data) from sensors in the vehicle user device 151 or vehicle 161; receiving vehicle-specific information from vehicle manufacturers and/or dealers 141; predicting relevant educational content or search parameters based on user input, vehicle-specific information and vehicle conditions data; and performing other related functions as described herein. For example, machine learning algorithms may be trained to predict an appropriate educational content, based on a quantifiable set of vehicle conditions data and user input pertaining to a critical event, based on a repository of data of past vehicle user's selection of educational content for past critical events.

As used herein, vehicle-specific information may include, but is not limited to, identifying information of a vehicle ("vehicle identification") (e.g., vehicle identification number (VIN), descriptive identification (e.g., make, model, class, year of manufacture, color, etc.), automobile nameplate, etc.); distinguishing features, longevity, and physical measurements pertaining to a make, model, class, or year of manufacture of a vehicle; driving history; repair and maintenance history; and vehicle conditions. For example, vehicle-specific information may include the type of transmission (e.g., automatic versus manual), category of vehicle (e.g., minivan, sedan, convertible, etc.), vehicle maintenance history, vehicle accident history, safety/feature malfunction related vehicle recalls announced by the manufacturer, ownership and type of use history (e.g., in a ridesharing system), structural fixtures, etc.

Vehicle conditions data may be a subset of vehicle-specific information, and may refer to a measurement of functional performance, health, durability, aging, structural condition, aesthetic appeal, or wear for a specific vehicle feature or aspect. It is contemplated that various methods presented herein overcome subjective human assessment of a condition by relying directly on sensors to measure conditions. Vehicle features may include a vehicle's exterior, interior, mechanical, software, or hardware, which may be prone to aging, rust, damages, errors, etc. Thus, vehicle features may include, e.g., tires, mileage, any part of the vehicle's body (exterior and interior), engine performance, oil filter, any machinery of the vehicle, safety features, car seats, vehicle entertainment system, lighting, autopilot performance, etc.

In some arrangements, factors that are not vehicle-specific may also be considered in the determination of appropriate educational content or the generation of search parameters for educational content.

As discussed below, the data transferred to and from various devices ("dispatch data") in system 100 may include secure and sensitive data, such as confidential vehicle operation data, insurance policy data, vehicle profile data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, roadside assistance servers, client portal servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption.

Figure 2:
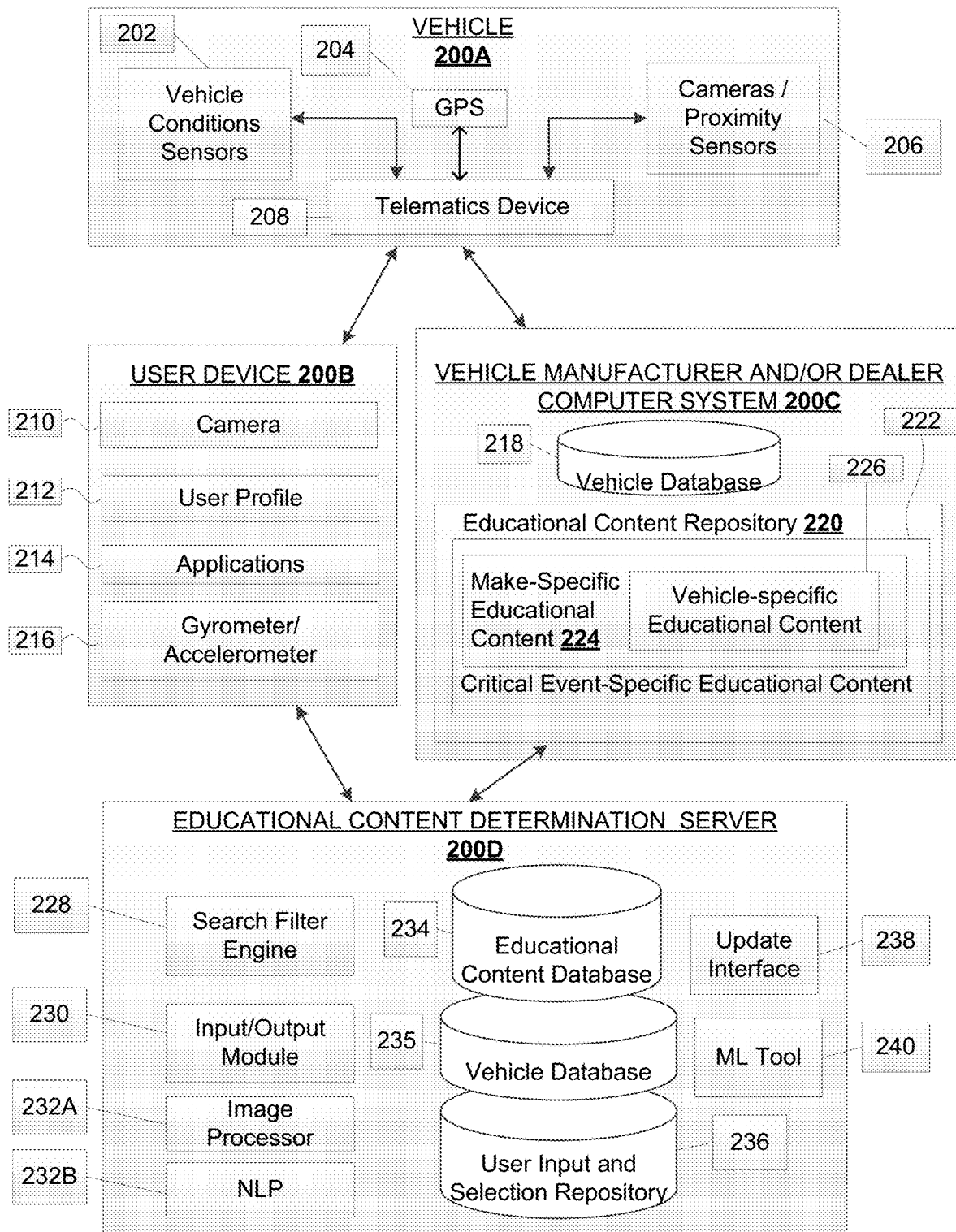
FIG. 2 is a diagram of an educational content determination system, according to one or more aspects of the disclosure.

FIG. 2 is a diagram of an educational content determination system 200, according to one or more aspects of the disclosure. Each component shown in FIG. 2 may be implemented in hardware, software, or a combination of the two.

Additionally, each component may include a computing device (or system) having some or all of the structural components described above for computing device 101.

The educational content determination system 200 shown in FIG. 2 includes a vehicle 200A, such as an automobile, motorcycle, recreational vehicle, boat, or other vehicle for which its user ("vehicle user") solicits educational content, or notifies that the vehicle has undergone a critical event. A critical event may refer to a vehicle breakdown, malfunction, maintenance issue, or any other event that may involve a repair or attendance. The conditions of various features of the vehicle may be measured via sensors on user device 200B and/or vehicle 200A. The vehicle 200A may include vehicle conditions sensors 202 capable of detecting and recording various conditions at the vehicle and operational parameters of the vehicle. For example, vehicle conditions sensors 202 may detect and store data corresponding to the vehicle's speed, distances driven, rates of acceleration or braking, and specific instances of sudden acceleration, braking, and swerving. Sensors 202 may also detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additionally, sensors 202 may detect and store the vehicle's external features and driving conditions, for example, the vehicle's front, side, and rear body exterior, the vehicle's windshield conditions, the vehicle's wiper conditions, external temperature, rain, snow, light levels, and sun position for driver visibility. Sensors 202 may also detect and store data relating to moving violations and the observance of traffic signals and signs by the vehicle 200A. Additionally, sensors 202 may detect and store data relating to the vehicle's mechanical features and that provide further indications of maintenance of the vehicle 200A. The data gathered from these sensors may include, for example, the engine status, oil level, engine coolant temperature, odometer reading, the level of fuel in the fuel tank, engine revolutions per minute (RPMs), and/or tire pressure.

The vehicle 200A also may include one or more cameras and proximity sensors 206 capable of recording additional conditions inside or outside of the vehicle 200A. Internal cameras 206 may detect conditions such as the number of the passengers that typically ride the vehicle 200A, and conditions of the interior features of the vehicle (e.g., habitability, dashboard wear, seat wear). External cameras and proximity sensors 206 may detect other nearby vehicles, traffic levels, road conditions, traffic obstructions, animals, cyclists, pedestrians, and other conditions that may factor into identifying or determining relevant educational content.

Sensors 202 and 206 may store data within the vehicle 200A (e.g., telematics device 208), and/or may transmit the data to one or more external computer systems (e.g., vehicle manufacturer and/or dealer computing system 200C, educational content determination server 200D, etc.). As shown in FIG. 2, the vehicle conditions sensors 202, and the cameras and proximity sensors 206, may be configured to transmit data externally via a telematics device 208. In other examples, one or more of the vehicle conditions sensors 202 and/or the cameras and proximity sensors 206 may be configured to transmit data directly without using a telematics device 208. For example, telematics device 208 may be configured to receive and transmit data from vehicle conditions sensors 202, while one or more cameras and proximity sensors 206 may be configured to directly transmit data to the educational content determination server 200D or the vehicle manufacturer and/or dealer computing system 200C without using the telematics device 208. Thus, telematics device 208 may be optional in certain embodiments where one or more sensors or cameras 202 and 206 within the vehicle 200A may be configured to independently capture, store, and transmit vehicle conditions and driving data.

Telematics device 208 may be a computing device containing many or all of the hardware/software components as the computing device 101 depicted in FIG. 1. As discussed above, the telematics device 208 may receive data pertaining to a vehicle's conditions from vehicle conditions sensors 202, and cameras 206, and may transmit the data to one or more external computer systems (e.g., a vehicle manufacturer and/or dealer computer system 200C and/or educational content determination system 200D) over a wireless transmission network. Telematics device 208 also may be configured to detect or determine additional types of data relating to real-time driving and the condition of the vehicle 200A. In certain embodiments, the telematics device 208 may contain or may be integral with one or more of the vehicle conditions sensors 202 and proximity sensors and cameras 206 discussed above, and/or with one or more additional sensors discussed below. Nevertheless, a vehicle 200A does not necessarily have to include a telematics device 208. Furthermore, telematics data collected by the telematics device 208 may be sent to the vehicle manufacturer and/or dealer computer system 200C. The educational content determination server 200D may receive educational content from the vehicle manufacturer and/or dealer computer system 200C, which may be updated or customized based on the telematics data received by the vehicle manufacturer and/or dealer computer system 200C.

The telematics device 208 also may collect information regarding the vehicle's location, driver's route choice, whether the driver follows a given route, a percentage of miles that a vehicle is driven in autonomous mode verses manual mode if applicable, and a classification or type of trip (e.g. commute, errand, new route, etc.) via a global positioning system (GPS) 204. Information regarding routes traversed by the vehicle (e.g., gained from sensors in GPS 204) may provide information on why the conditions for one or more vehicle features are the way they are. Furthermore, GPS 204 may provide geographical information that may be helpful in the delivery of relevant content. For example, GPS data may be used by the educational content determination server 200D for dispatching relevant educational content, determine an estimated time of arrival (ETA) and/or an actual time of arrival (ATA) for a roadside service provider vehicle, or to locate a vehicle for customer visibility. As a further example, if the vehicle is parked or driving around a mountainous area, an educational content involving braking may be catered towards braking in hilly terrains. Thus, information supplied by GPS 204 may be useful to determine relevant educational content or to generate search parameters to determine relevant educational content.

The telematics device 208 also may store vehicle-specific information, for example, the make, model, trim (or submodel), year, and/or engine specifications. The vehicle type may be programmed into the telematics device 208 by a user or customer, determined by accessing a remote computer system, such as manufacturer and/or dealership computer systems 200C, or may be determined from the vehicle itself.

Vehicle manufacturer and/or dealer computer system 200C may be a computing device separate from the vehicle 200A, containing some or all of the hardware/software components as the computing device 101 depicted in FIG. 1. The vehicle manufacturer and/or dealer computer system 200C may be configured to receive and store vehicle-specific information of vehicles manufactured by or sold by a vehicle manufacturer and/or dealer. Thus, a vehicle manufacturer such as TOYOTA would be expected to have a computer system storing vehicle-specific information for its fleet of vehicles, by vehicle type, class, model, and year of manufacture, etc. The vehicle-specific information may be stored in a vehicle database 218. It is envisioned that at least some vehicle manufacturers and/or dealers may publish or possess educational content for users of its vehicles. For example, TOYOTA may publish vehicle manuals, responses to frequently asked questions (FAQs), multimedia content, and the like, to inform its vehicle users for how to handle the vehicle in various critical events. Educational content, which a vehicle manufacturer and/or dealer may publish or possess, may be organized, e.g., in an educational content repository 220, in multiple arrangements. As shown in FIG. 2, in at least some arrangements, educational content may be make-specific (e.g., make-specific educational content 224), where the educational content is specifically catered for vehicles manufactured or made by a specified manufacturer (e.g., TOYOTA). In some aspects, a category of make-specific educational content may be vehicle-specific educational content 226, where the educational content is specifically for a type, class, model, and/or year of manufacture. Vehicle-specific educational content 226 for a vehicle may be obtained using a VIN of the vehicle. Also or additionally, educational content may be categorized based on the breakdown or critical event (e.g., critical event-specific educational content 222). Critical event-specific educational content 222 may include, for example, instructions on how to drive through snowy roads, how to operate your car when there is a brake failure, how to jump start a vehicle, how to properly tow a vehicle (e.g., via "hook-up" points to secure the vehicle to the tow truck), etc. In such examples, a weather related incident (e.g., snow) or vehicle breakdown (e.g., a brake failure) could be causes for the critical event. Although make-specific educational content 224 and vehicle-specific educational content 226 are shown to be categories within critical event-specific educational content, this does not need to be so, as some educational content may be useful to vehicle users even when there are no critical events (e.g., how to take care of your car better). In one embodiment, the vehicle manufacturer and/or dealer computer system 200C may act as a management system for vehicle systems (e.g., telematics devices).

User device 200B may be a computing device separate from the vehicle 200A and the vehicle manufacturer and/or dealer computer system 200C. User device 200B (alternatively referred to as "mobile device") may include a mobile phone (e.g., smartphone), personal computer, tablet computer, laptop, or the like, which may include at least some of the features described herein. The user device 200B may be configured to send notifications of a critical event, or requests for educational content that may pertain to the critical event. The user device 200B, via its sensors may also receive and store the vehicle conditions data discussed above from vehicle 200A. Furthermore, the user device may be able to form wired and/or wireless data connections with other computing systems and devices, such as the educational content determination server 200D, described further below, via the internet 131 or telecommunications network, 133 and 135. The user device 200B may include various sensors configured to collect and transmit data related to conditions of various vehicle features. For example, the user device may include an in-built or accessible camera 210 that may generate image, sound, and/or video data. Other sensors within the user device may include a gyrometer or accelerometer 216 to measure acceleration and/or rotation of the vehicle. Other types of sensors may also be downloaded as applications 214. The user device 200B may also store user-specific identifying information, e.g., as part of user profile 212, which can be accessed by the educational content determination server 200D. In some aspects, the user profile 212 may indicate and/or identify the user's vehicle. For example, the educational content determination server 200D may use the user profile 212, when it receives a notification of a critical event or a request for educational content, to identify the vehicle of the vehicle user. The user device may also run programs or applications 214 on a user interface. One application or program may enable a user of a vehicle or a roadside assistance provider to use the systems and methods described herein to receive educational content that is specific to the vehicle during critical events. The application or program may be provided to the user device or hosted by educational content determination server 200D (e.g., via application programs interface 119). Through a user interface of the application or program 214, the vehicle user or a roadside assistance provider may be able to send notifications, requests, user input, or vehicle-specific information, and receive and view educational content. In one embodiment, the user device may include one or more subcomponents of computing system 101. There may be a plurality of user devices 200B, e.g., for various roadside assistance service providers (e.g., tow drivers) as well as for the users of vehicles that run into a critical event.

The system 200 also may include a remote, local, or connected server or computing system for determining educational content based on user input and vehicle-specific information ("educational content determination server") 200D, containing some or all of the hardware/software components as the computing device 101 depicted in FIG. 1. The educational content determination server 200D may include hardware, software, and network components to receive user input, vehicle-specific information (including vehicle conditions data), vehicle identification information from the various components shown in FIG. 2, e.g., vehicle(s) 200A, user device(s) 200B, vehicle manufacturer and/or dealer 200C, and/or from external sources. The educational content determination server 200D, the vehicle manufacturer and/or dealer computer system 200C, and the user device 200B may be implemented as a single server/system, or may be separate servers/systems. In some examples, the educational content determination server 200D may be a central server configured to receive user input, vehicle-specific information, and vehicle conditions data from a plurality of remotely located computer systems 200A, 2008, or 200C.

As shown in FIG. 2, educational content determination server 200D may include an educational content database 234; a database, memory, or repository to store vehicle-specific information (e.g., vehicle database 235); a database, memory, or repository of past user input, received vehicle-specific information, and user selection of educational content (e.g., user input and selection repository 236); a search filter engine 228; an input/output module 230; an image processor 232A; a natural language processor (NLP) 232B; an update interface 238; and an application program, plug-in, or tool that trains and applies machine learning (ML) algorithms to better predict search parameters and educational content based on user input, vehicle-specific information, etc. (e.g., ML tool 240).

One or more of the search filter engine 228, input/output module 230, image processor 232A, NLP 232B, update interface 238, and ML tool 240 may be implemented in hardware and/or software configured to perform a set of specific functions within the educational content determination server 200D. For example, the input/output module 230 may receive notifications from a user device 200B or vehicle 200A regarding a critical event, requests for educational content and other user input from user device 200B, and vehicle-specific information from vehicle systems 200A, user device 200B, vehicle manufacturer and/or dealer computer system 200C, and third parties. The input/output module 230 may also be used to output educational content, establish connections, and/or send requests for information and other input respectively to the various components described above. In some aspects, the input/output module 230 may include a communications module for transmitting or converting signals so that they are delivered to the described components in the appropriate networking means.

The image processor 232A and NLP 232B may be used to receive image or natural language input, respectively, from user device 200B, vehicle system 200A, vehicle manufacturer and/or dealer computer system 200C, etc. For example, a vehicle user, on a user interface of user device 200B running an application for delivering educational content, may enter a user input in natural language—"Help! My car is stuck in the snow!" The NLP may process the natural language input so that the educational content determination server 200D may receive signals that it understands. Thus, in the example input, the NLP may detect a weather related critical event (e.g., car stuck in the snow). The user profile 212 of user device 200B may be used to identify the vehicle which is stuck in the snow. The NLP may include a memory, and may support common natural language processing tasks, such as tokenization, sentence segmentation, part-of-speech tagging, named entity extraction, chunking, parsing, and coreference resolution.

Likewise, image processor 232A may be used to process the visual input so that the educational content determination server 200D may receive signals that it understands. For example, the image processor 232A may receive images captured by a camera (e.g., on vehicle 200A or user device 200B), refine the images, compare to reference images (e.g., received from vehicle manufacturer and/or dealer computing system 200C or other third parties (e.g., government, bluebook listings, etc.)), render any analysis (e.g., whether a vehicle condition has worsened, whether there is a mismatch in the images, or whether there is an issue of a specific aspect or feature of a vehicle), and output the results.

It is contemplated that other types of processors (e.g., speech and audio signal processors) may also be used, as applicable, to convert user input, vehicle conditions data, and the like, into executable signals for the educational content determination server to use to determine relevant educational content and/or search parameters for educational content.

Figure 3:
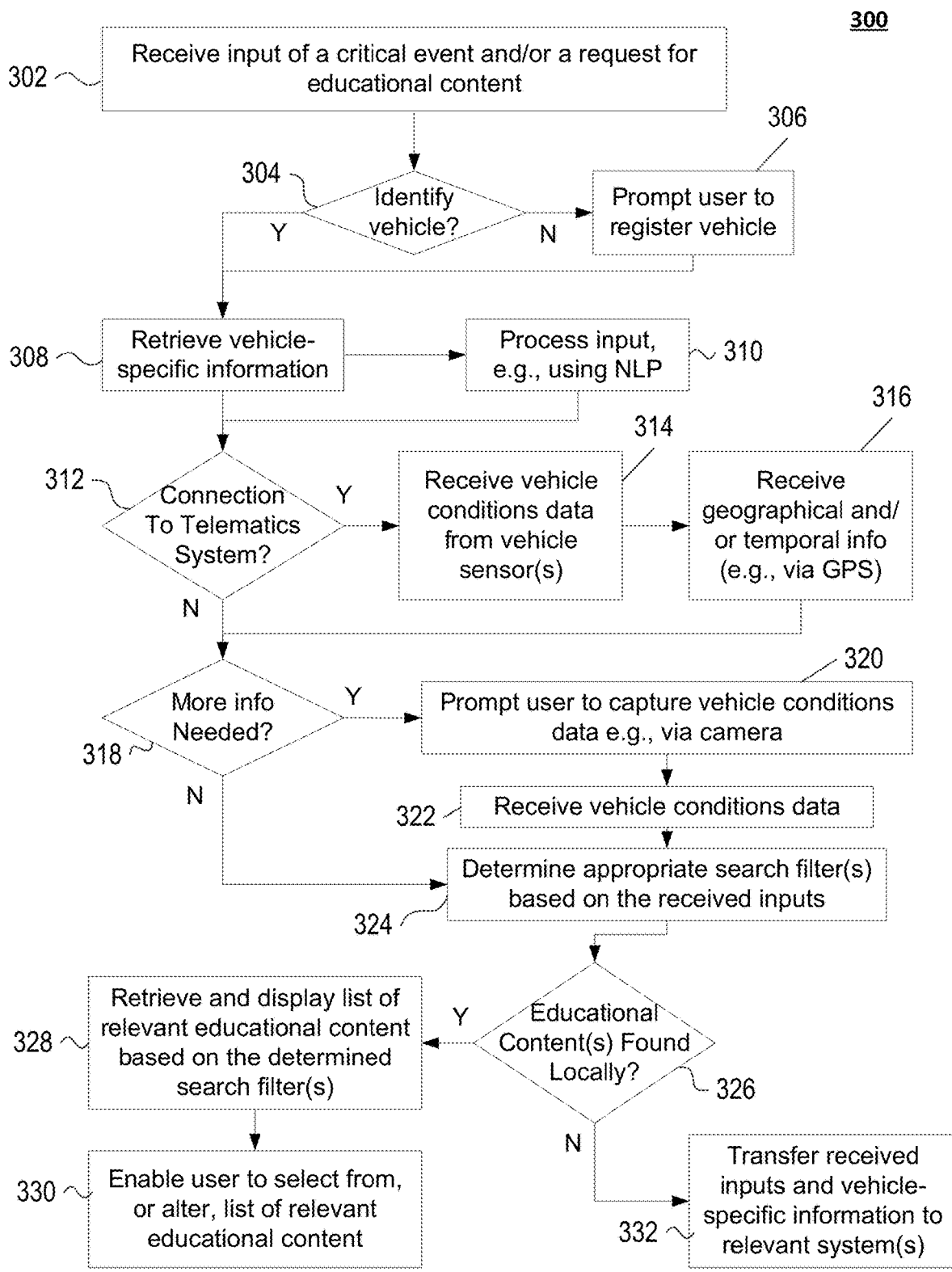
FIG. 3 illustrates a flow diagram of an example method of delivering vehicle-specific educational content for a critical event, according to one or more aspects of the disclosure.

The search filter engine 228 may collectively receive the processed inputs from the input output module 230, e.g., via the image processor 232A and NLP 232B, and query the educational content database 234 for relevant educational content. The query may be performed by using the received processed input to determine appropriate search parameters, and using the search parameters to locate educational content associated with the search parameters, and compiling a list. Method 300, as depicted in FIG. 3 describes some implementations of this process in further detail.

Figure 4:
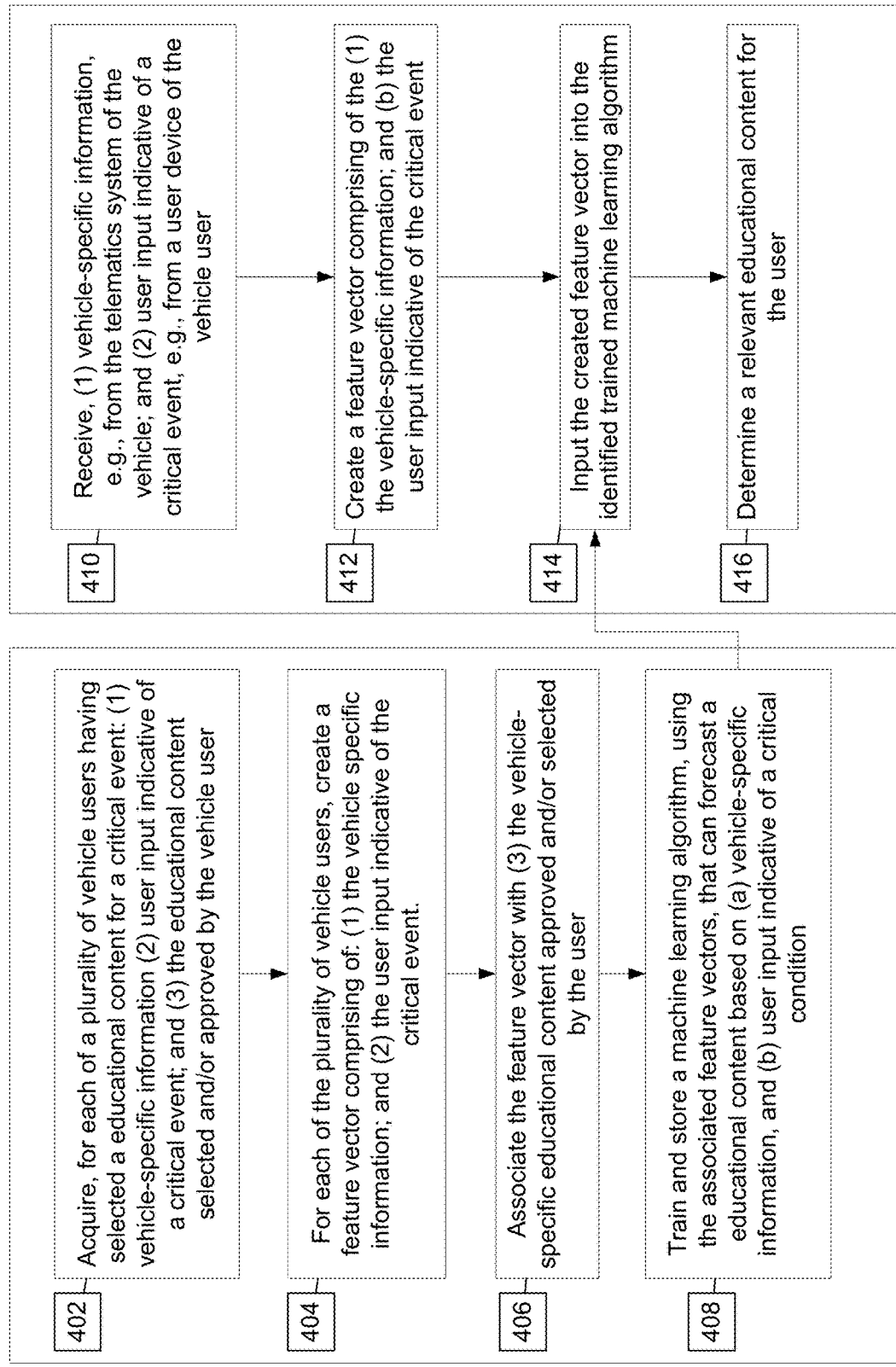
FIG. 4 illustrates a flow diagram of an example method of determining educational content using a machine learning based classifier, according to one or more aspects of the disclosure.

In some aspects, the user input and selection repository 236 may record inputs or processed inputs, as they are received, as well as one or more of the educational content delivered to the user device or the educational content selected or deemed to be most relevant by the user (e.g., as indicated from the user device 200B). The repository 236 may be used as training data to determine patterns or determine machine learning algorithms to better predict relevant educational content. As will be described in method 400, which is depicted in FIG. 4, the ML tool 240 may train machine learning algorithms using feature vectors comprising of processed inputs (e.g., vehicle conditions, user input indicating an issue with a vehicle feature or vehicle aspect), and associate the feature vectors with the educational content that the user eventually selected, eventually viewed and/or eventually approved. In some aspects, the ML tool 240 may also be used to determine the search parameters most relevant to obtaining the educational content eventually selected, or deemed most relevant, to the user. Nevertheless, it is contemplated that a vehicle user or service provider may not necessarily have to select among a plurality of educational content for a relevant educational content. In some aspects, the determination of a relevant educational content may be more straightforward. For example, a vehicle user or tow driver may simply request towing instructions from the educational content determination server 200D for a vehicle identified by its vehicle-specific identifying information. The educational content determination server 200D may then provide a link to an education content available within a content library. The educational content may pertain to how to tow a vehicle of the particular year, make, and model of the vehicle specified by the vehicle-specific identifying information. The link can be automatically attached to a dispatch for a tow driver to review, prior to servicing the vehicle.

The educational content database 234 may store a list of educational content. As described above, educational content may impart information aimed to assist a vehicle user in overcoming a critical event. A critical event may refer to a vehicle breakdown, malfunction, maintenance issue, or any other event that may involve a repair or attendance. The educational content may include a variety of multimedia (e.g., audios, videos, images, documents, guides, presentations, or a combination thereof). The educational content database 234 may categorize educational contents in multiple ways. In one aspect, the educational contents may be categorized as shown for the educational content repository 220 (e.g., critical event-specific educational content 222, make-specific educational content 224, vehicle-specific educational content 226). Each educational content may have a tag, metadata, or other linking mechanism that associates the educational content with one or more search filters or search parameters. A search filter or search parameter may associate an educational content with a vehicle user's needs, e.g., by detecting recognizable terms from the processed inputs. Thus, in the exemplary natural language input of "Help! My car is stuck in the snow!" search filters may include, e.g., weather-related events, snow, vehicle immobility, hazardous roads, etc.

The update interface 238 may be used to communicate with external systems to periodically update (e.g., add, delete, edit, change, etc.) the educational contents stored in the educational contents database 234, and the vehicle profiles and vehicle-specific information stored in the vehicle database 235. For example, the update interface 238 may add any new educational contents published by vehicle manufacturers and/or dealers into the educational contents database 234 or replace any outdated educational contents. Thus, the educational contents database 234 may be a content library that can be periodically re-formatted to reflect updated educational content based on updates received from the computing system of a vehicle manufacturer and/or dealer.

FIG. 3 illustrates a flow diagram of an example method 300 of delivering vehicle-specific educational content for a critical event, according to one or more aspects of the disclosure. One or more steps of method 300 may be performed by various components of the educational content determination server 200D.

Referring to FIG. 3, step 302 may include receiving an input of a critical event and/or a request for educational content from a user device 200B of a vehicle user. The input may be sent via a user interface of an application 214 on the user device 200B, and may be delivered across a wireless network. The application 214 may be hosted by the educational content determination server 200D, and may enable a user to communicate with the educational content determination server to perform methods described herein for educational content delivery. For example, a vehicle user may type "Help! My car is stuck in snow!", or may select a critical event (e.g., weather-related road conditions) from a list of critical events. As described above, an educational content may impart information aimed to assist a vehicle user in overcoming a critical event. The educational content may also assist a roadside service provider (e.g., tow truck driver) on how to help the vehicle user. A critical event may refer to a vehicle breakdown, malfunction, maintenance issue, or any other event that may involve a repair or attendance. The educational content may be in one or more multimedia forms (e.g., audios, videos, portable document format (PDF), images, documents, guides, presentations, or a combination thereof).

In some aspects, the notification may be received from vehicle systems 200A, for example, from a button or other in built functionality to send emergency notifications while inside a vehicle.

Based on the received notification, the educational content determination server 200D may determine the vehicle of the vehicle user. In one aspect, the educational content determination server 200D may rely on stored data linking known user device to identifiable vehicles owned or used by the users or the user devices. In other aspects, the application 214 of the user device 200B may prompt the vehicle user to enter vehicle identification details ("register vehicle"). Thus, at step 304, the educational content determination server may determine whether it can identify the vehicle of the vehicle user based on the communication received in step 302. If not, the user may be prompted to register the vehicle by sending vehicle identification information to the educational content determination server 200D.

Using the vehicle identification, the educational content determination server 200D may retrieve vehicle-specific information (e.g., as in step 308). As described above, vehicle-specific information may include a vehicle's distinguishing features, longevity, and physical measurements pertaining to a make, model, class, or year of manufacture of a vehicle; driving history; repair and maintenance history; and vehicle conditions for one or more features or aspects of the vehicle. For example, the educational content determination server 200D may obtain information on the original conditions of a specific vehicle feature or aspect pertaining to the critical event (e.g., original condition of the vehicle's front tire). The vehicle-specific information may be retrieved from memory (e.g., vehicle database 235) or from an external source (e.g., vehicle manufacturer and/or dealer computer system 200C).

At step 310, the educational content determination server 200D may process the received inputs from step 302 and 308. For example, where a notification of a critical event by a vehicle user was in natural language, NLP 232B may parse the natural language input to detect recognizable terms that can be used to determine search parameters. Furthermore, an image processor may be used to refine any images entered by the vehicle user in the original input, e.g., in step 302.

In some aspects, the educational content determination server 200D may determine that it needs more information to provide relevant educational content. Also or alternatively, the educational content determination server 200D may leverage existing connections with systems capable of delivering information that may be used by the educational content determination server 200D to provide the relevant educational content. Thus, step 312 may include determining whether the educational content determination server 200D has a connection (or can establish a connection) with the telematics system of the vehicle. If so, the educational content determination server 200D may receive vehicle conditions data gathered by vehicle sensor(s), GPS, and other on-board diagnostics tools, via the telematics system 208. The type of vehicle conditions data received or requested to be received may depend on the nature of the critical event or received user input. For example, if the vehicle user had indicated the vehicle is stuck in snow (e.g., in step 302), the educational content determination server 200D may receive data obtained by sensors measuring tire performance, e.g., to see how stuck the vehicle is. At step 316, the educational content determination server 200D may also receive geographical and/or temporal info (e.g., via GPS). Thus, in the example described above, the educational content determination server 200D may determine the location of the vehicle that is stuck in snow, e.g., to gage incoming traffic, so that an appropriate educational content is delivered that does not compromise the vehicle user's safety.

Furthermore, to gain more information to determine relevant educational content, or to leverage connections with the systems that could provide more information, step 320 may include prompting the vehicle user to send more vehicle-specific data. In some aspects, step 320 may be based on a determination of whether there is sufficient input regarding the critical event and sufficient vehicle-specific information to deliver relevant educational content (e.g., step 318—"more info needed?"). The type of vehicle-specific information to be requested to be sent may depend on the nature of the critical event or received user input. A user may be asked to send further identifying information of the vehicle, and the user may enter the requested identifying information on a user interface of user device 200B. However, a user may be asked to provide data regarding vehicle conditions of a pertinent vehicle feature or aspect that may be the subject of the critical event. Data regarding a vehicle condition may be obtained using sensors in the user device 200B. For example, a user may be asked to take a photo of the vehicle's tires if the user had previously notified the educational content determination server of being stuck in the snow. Thus, at step 322, vehicle-specific information (e.g., vehicle conditions data) may be received. Like step 310 the received information may be processed, e.g., by NLP or an image processor, to identify recognizable terms.

At step 324, the educational content determination server 200D may determine appropriate search parameters based on the received or processed inputs from steps 302, 308, 310, 314, 316, and 322. In some aspects, relations between various combinations of recognizable inputs and the search parameters that provide relevant educational content can be learned, e.g., via machine learning algorithms. Method 400, as described in FIG. 4 describes at least some implementations for the training and application of machine learning to determine relevant educational content based on a set of inputs comprising vehicle-specific information and user input indicating a critical condition.

As described above, each educational content may include a tag, metadata, or other linkage mechanism that associates the educational content with one or more search parameters. A search parameter may indicate that an educational content pertains to at least an aspect of a vehicle user's needs. The search parameters may be based on common and/or recognizable terms from processed user inputs and vehicle-specific information.

Each input may yield a set of search parameters that may be used to refine search results for relevant educational content from the educational content database 234. Thus, an initial user input notifying a critical event ("Help! My car is stuck in the snow!") may yield an initial set of search parameters (e.g., weather-related road conditions, snow, vehicle immobility). Furthermore, search parameters may pertain to roadside assistance events, e.g., towing procedures, jump start procedures, lock smith processes, etc. The initial set of search parameters may be used to generate an initial list of relevant educational content from a master list (e.g., the educational content database 234). The initial set of search parameters may be used to filter the educational content database so that only those educational content with the desired tags, metadata, or linkage mechanisms showing the search parameters are included in the initial list. However, with each new input (e.g., received vehicle-specific information, new user input further describing the critical condition, etc.), additional sets of search parameters may be generated. For example, if the vehicle user is prompted to deliver vehicle conditions data regarding the vehicle's tire, and the educational content determination server 200D deems the tire to be of a poor quality, a search parameter of "tires" may also be added to the set of search parameters. Also or alternatively, a new set of search parameters may be formed, by combining the recent search parameters with the initial set of search parameters from the first user input. As each search parameter has the potential to alter the educational content selected from the educational content database 234, the list of relevant educational content may be affected by the number and types of search parameters used.

There may be scenarios where the educational content determination server 200D may determine that there is not a threshold quantity of educational content, or that an educational content may not be found locally in the educational content database 234 (e.g., as in step 326). In some aspects, if relevant educational content cannot be found locally, whether due to insufficient search parameters, or insufficient input, the educational content determination server may outsource the request for educational content, with the received inputs and vehicle-specific information, to an external source (e.g., vehicle manufacturer and/or dealer computer systems 200C) (e.g., as in step 332). In other aspects, if relevant educational content cannot be found locally, no educational content would be delivered by the educational content determination server.

If a threshold quantity of educational content can be retrieved from the educational content database 234 based on the search parameters, the educational content determination server 200D may display the list of the relevant educational content on an application 214 of the user device 200B. The application 214 may enable the user to select from, or alter, list of relevant educational content (e.g., as in step 330). For example, a user can enter new input, which may cause the educational content determination server to form new search parameters, and thereby yield new educational content to the list. In some aspects, educational content can be liked or disliked by the user. Furthermore, educational content may be recommended to the user based on the user's selection or viewership of another educational content.

Thus, educational content can come in a variety of forms (e.g., step-by-step guides, audio, video, visuals, etc.) and may be based on a vehicle and/or a critical event. Educational content can be stored for a plurality of vehicle types, e.g., a 2019 Ferrari GTC4LUSSO, a 2019 Maserati Levante, and a 2018 BMW X3. The educational content determination server may receive educational content pertaining to the 2019 Ferrari GTC4LUSSO from a Ferrari manufacturer and/or dealer, e.g., electronically from the computing system of the Ferrari manufacturer and/or dealer. After the educational content is received, the educational content determination server may update its educational content database.

For example, educational content for a 2019 Ferrari GTC4LUSSO may include a step-by-step visual guide on how to tow such a vehicle. A first slide of the guide may depict a tow pin on the vehicle, with a caption, e.g., "Tow pin is located in the tool kit in the trunk. Tow pin receptacle is located in the driver's side frame rail/Install tow pin and ensure it is tight so it become one with the frame rail." A second slide may depict a catch and lead strap attached to the vehicle, with a caption, e.g., "Good Practice: Add catch and lead strap." A third slide may depict an override procedure with a caption, e.g., "Gear box tool located in the tool kit. Remove the rubber plug top side of tool kit to access the override tunnel. Insert the gear box override tool and turn to release gear box." A fourth slide may depict an emergency brake release with a caption, e.g., "The Emergency Brake release tool is located in the tool kit. Insert the tool and turn clockwise approx. 50 times to completely release parking brake." Educational content on how to tow the 2019 Ferrari GTC4LUSSO may also include a video to lead the viewer through the above-described steps for towing.

Likewise, educational content for the 2019 Maserati Levante may include a step by step guide on how to jump start the vehicle. For example, an example guide may comprise of the following steps: step one—pull hood release; step two—move yellow lever to left to unlock hood; step three—remote jump points located on the passenger side; and step four—perform a proper hook up by connecting a positive cable, connecting the negative cable when removing cables, making sure to remove the negative cable before removing the positive cable. Images and/or videos may be accompanied with the steps to better teach the educational content.

Likewise, educational content for the 2018 BMW X3 may include a step by step guide on how to tow the vehicle. The educational content may suggest that a "flatbed tow" may be an approved method for towing BMW vehicles, and that an "8 Point Tie Down" may be a preferred method for flatbed transport. A first slide of the guide may depict a tow pin location on the vehicle, with a caption "Tow pin is located in the trunk on the driver side compartment. Remove panel to locate the two pin in the tray." A second slide may depict an attachment point on the vehicle with the caption "Tow pin receptacle is located on the passenger frame rail—remove tow pin cover and store inside the vehicle. Thread tow pin tight so that it becomes one with the frame rail." A third slide may depict an installed lead strap and catch strap, with the caption "Good Practice—Install Lead Strap & catch strap to reduce damage exposure to the front of the vehicle." A fourth slide may depict a vehicle's hood interior with the caption "No Power Situation—If the vehicle does not have the power to shift into neutral apply a jumper box for 3-15 minutes to power the shifter. If you are unable to power the shifter you will need to skate the vehicle." Images and/or videos may be accompanied with the steps to better teach the educational content.

Also or alternatively, relevant educational content may be determined based on data obtained from sensors of the vehicle.

FIG. 4 illustrates a flow diagram of an example method of determining educational content using machine learning, according to one or more aspects of the disclosure. The method depicted in FIG. 4 may include a training method 400A for training one or more machine learning algorithms based on, e.g.: vehicle-specific information (e.g., measurement of vehicle conditions); user input identifying and describing a critical condition; and the educational content eventually selected and/or viewed by the user. The method depicted in FIG. 4 may also include a production method 400B for using the trained machine learning algorithm to determine or predict relevant educational content. In one embodiment, based on the tags or metadata of the relevant educational content that indicates search parameters, the trained machine learning algorithm can also be used to determine relevant search parameters. Methods 400A and 400B may be performed by the ML tool 240 of the educational content determination server 200D. Alternatively, the training method (e.g., 400A) may be performed by an external server or computing system (e.g., an AI-based firm or research organization). In such implementations, the trained machine learning algorithm may be retrieved by the educational content determination server 200D to predict or determine relevant educational content via method 400B.

Thus, step 402 may include acquiring, for each of a plurality of vehicle users that have (in the past) selected (or otherwise approved) educational content for a critical event, a training data set for the machine learning algorithm to be trained. The training data set may include, but is not limited to: (1) vehicle-specific information (2) user input indicative of a critical event; and (3) the educational content selected and/or approved by the vehicle user.

As described above, vehicle-specific information may include, but is not limited to, identifying information of a vehicle ("vehicle identification"), including descriptive identification (e.g., make, model, class, year of manufacture, color, automobile nameplate, etc.); distinguishing features, longevity, and physical measurements pertaining to a make, model, class, or year of manufacture of a vehicle; driving history; repair and maintenance history; and vehicle conditions. Vehicle conditions data may include measurements of performance, health, durability, aging, aesthetic appeal, or wear for a specific vehicle feature or aspect. Thus, vehicle conditions data may measure the conditions of a vehicle's exterior, interior, mechanical, software, or hardware, which may be prone to aging, rust, damages, errors, etc. For example, vehicle conditions data may include, e.g., tires, mileage, any part of the vehicle's body (exterior and interior), engine performance, oil filter, any machinery of the vehicle, safety features, car seats, vehicle entertainment system, lighting, autopilot performance, etc. In some implementations, the vehicle conditions data may be obtained by establishing a connection with the telematics system or server of the vehicle.

User input indicative of a critical event (e.g., as received in step 302 of method 300) may be used to identify and/or classify the critical event, or to determine the severity of the critical event. Each critical event or category of critical event may make some vehicle-specific information more relevant than others. For example, a critical event of a brake failure may make the conditions of the vehicle's brakes more relevant than others. Thus, vehicle-specific information of data obtained from brake sensors in the vehicle may be given more importance than irrelevant vehicle-specific information, such as the color of the vehicle. The ML tool 240 may appropriately assign feature weights to the vehicle-specific information in amounts based on the critical event and severity of the critical event determined from the user input.

Step 404 may involve creating feature vectors for each of the plurality of vehicle users that had selected or otherwise approved an educational content for a critical event in the past. The feature vector may include, for example: (1) vehicle specific information; and (2) user input indicative of the critical event. Each of these features may be quantified, classified (e.g., into binary groups) and/or expressed as mathematical functions. The feature vectors may be associated with the vehicle-specific educational content approved and/or selected by the user in the past (e.g., as in step 406).

Step 408 may include training a machine learning algorithm using the associated feature vectors. The resulting machine learning algorithm would be one that can forecast a date of service for a service type and a vehicle type based on (a) the vehicle conditions data, and (b) the vehicle driving data, during a date of request. The training of the machine learning algorithm involves supervised learning between a domain (e.g., the feature vectors) and a range (e.g., the duration of time between the points and the date of the service rendered). Examples of machine learning algorithms may include, but are not limited to multi-layer perceptron, neural networks, support vector machines, linear regression, logistic regression, decision tree learning, or a combination thereof.

The training method 400A may then save the results of the machine learning algorithm, including feature weights, in a memory (e.g., ML tool 240) of the educational content determination server 200D. Alternatively or additionally, an external computing system or server (e.g., a research lab) may save the trained machine learning algorithm, which can be retrieved to be used by the educational content determination server 200D for production method 400B. The stored feature weights may define the extent to which various user input and vehicle-specific information predict an educational content that is selected and approved by the vehicle user.

Production method 400B may be based on a request or command to determine relevant educational content based on a reported critical event. The request or command may be brought to the ML tool 240 accompanied by processed user inputs and vehicle-specific information from the input/output module 230 via the image processor 232A and NLP 232B.

Thus, at step 410, the ML tool 240 may receive (1) vehicle-specific information, and (2) user input indicative of a critical event. As was described above, vehicle-specific information (e.g., vehicle conditions data) may be obtained from sensors in the vehicle systems or user device. As was described above, the sensors from which vehicle conditions data are obtained may be the ones that are most relevant to the critical event for which educational content is being sought. Thus, for a vehicle being stuck in the snow, data may be obtained for sensors measuring the health of tires, outside temperature, engine temperature, and pressure.

User input indicative of the critical event may be determined, e.g., from a natural language input received from the user device 200B of the vehicle user. Step 412 may involve forming a feature vector of the received inputs and vehicle-specific information. Each of these features may be quantified, classified (e.g., into binary groups) and/or expressed as mathematical functions, as was done in the training phase 400A.

After identifying a trained machine learning algorithm, e.g., from training phase 400A, the educational content determination server 200B may input the created feature vector into the identified trained machine learning algorithm (e.g., as in step 414). Based on the training in method 400A, the trained machine learning algorithm may output relevant educational content(s) based on a vehicle user's input indicating a critical event and received vehicle-specific information (e.g., as in step 416).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
receiving, by a first computing device having at least one processor and from a user device of a vehicle user via a wireless data connection, a notification of a critical event for a vehicle of the vehicle user and a vehicle identification of the vehicle;
receiving, by the first computing device and from the user device via the wireless data connection, user input soliciting educational content to remedy the critical event;
determining, by the first computing device and based on the received user input, a first set of search parameters;
for each of the search parameters in the first set of search parameters, selecting educational content for a first list of educational content from a second list of educational content, wherein the first list of educational content is a subset of the second list of educational content;
determining, by the first computing device, whether the first list of educational content meets a content threshold,
upon determining that the first list of educational content does not meet the content threshold, transmitting a prompt to the user device relating to a modification to one or more components of the first set of search parameters;
upon receiving, by the first computing device and from the user device, an interaction with the prompt, modifying the first list of educational content in accordance with the interaction; and
upon determining that the modified first list of educational content meets the content threshold displaying, on the user device by the first computing device, the modified first list of educational content.

2. The method of claim 1, wherein the user input is a natural language input entered by the vehicle user on a user interface of the user device.

3. The method of claim 1, further comprising:
enabling the vehicle user to select from the displayed modified first list of educational content and view one or more educational content from the modified first list of educational content.

4. The method of claim 1, further comprising:
receiving, by the first computing device, vehicle-specific information based on the vehicle identification;
determining, by the first computing device and based on the received vehicle-specific information, an additional set of search parameters;
for each of the search parameters in the first set of search parameters, further selecting educational content for the first list of educational content from the second list of educational content; and
displaying, on the user device by the first computing device, the first list of educational content based on the first set and the additional set of search parameters.

5. The method of claim 4, further comprising:
establishing a connection with a telematics system of the vehicle; and
wherein the vehicle-specific information is received from vehicle sensors in the vehicle via the telematics system of the vehicle.

6. The method of claim 4, wherein the vehicle-specific information comprises data measuring a condition of an aspect of the vehicle.

7. The method of claim 4, wherein the vehicle-specific information comprises geographical and temporal information associated with the critical event.

8. The method of claim 1, further comprising:
determining, by the first computing device, that the first set of search parameters does not meet a threshold quantity.

9. The method of claim 8, further comprising:
prompting the vehicle user to send additional user input soliciting the educational content to remedy the critical event; and
wherein the received user input includes the additional user input.

10. The method of claim 4, wherein the vehicle-specific information is received from sensors in the user device.

11. A system comprising:
one or more processors; and
memory storing computer-executable instructions that, when executed by the one or more processors, cause the system to:
receive, from a user device of a vehicle user via a wireless data connection, a notification of a critical event for a vehicle of the vehicle user and a vehicle identification of the vehicle;
receive, from the user device via the wireless data connection, user input soliciting educational content to remedy the critical event;
determine, based on the received user input, a first set of search parameters;
for each of the search parameters in the first set of search parameters, select educational content for a first list of educational content from a second list of educational content, wherein the first list of educational content is a subset of the second list of educational content; p1 determine that the first list of educational content does not meet a content threshold;
transmitting a prompt to the user device relating to a modification to one or more components of the first set of search parameters;

upon receiving, from the user device, an interaction with the prompt, modifying the first list of educational content in accordance with the interaction; and upon determining that the modified first list of educational content meets the content threshold, display, on the user device, the modified first list of educational content.

12. The system of claim 11, wherein the computer-executable instructions further cause the system to:
receive vehicle-specific information based on the vehicle identification;
determine based on the received vehicle-specific information, an additional set of search parameters;
for each of the search parameters in the first set of search parameters, further select educational content for the first list of educational content from the second list of educational content; and
display, on the user device the first list of educational content based on the first set and the additional set of search parameters.

13. The system of claim 11, wherein the user input is a natural language input entered by the vehicle user on a user interface of the user device.

14. The system of claim 12, wherein computer-executable the instructions further cause the system to:
establish a connection with a telematics system of the vehicle; and
wherein the vehicle-specific information is received from vehicle sensors in the vehicle via the telematics system of the vehicle.

15. The system of claim 12, wherein the vehicle-specific information comprises data measuring a condition of an aspect of the vehicle.

16. The system of claim 12, wherein the vehicle-specific information comprises geographical and temporal information associated with the critical event.

17. The system of claim 11, wherein the computer-executable instructions further cause the system to:
determine that the first set of search parameters does not meet a threshold quantity of search parameters.

18. The system of claim 17, wherein the computer-executable instructions further cause the system to:
prompt the vehicle user to send additional user input soliciting the educational content to remedy the critical event; and
wherein the received user input includes the additional user input.

19. The system of claim 12, wherein the vehicle-specific information is received from sensors in the user device.

20. A non-transitory computer readable medium storing a program causing a computing device having at least one processor to execute a method, the method comprising:
receiving, from a user device of a vehicle user via a wireless data connection, a notification of a critical event for a vehicle of the vehicle user and a vehicle identification of the vehicle;
receiving, from the user device via the wireless data connection, user input soliciting educational content associated with the critical event;
determining, based on the received user input, a first set of search parameters;
for each of the search parameters in the first set of search parameters, selecting educational content for a first list of educational content from a second list of educational content, wherein the first list of educational content is a subset of the second list of educational content; p1 determining that the first list of educational content does not meet the content threshold,
transmitting a prompt to the user device relating to a modification to one or more components of the first set of search parameters;
upon receiving, from the user device, an interaction with the prompt, modifying the first list of educational content in accordance with the interaction; and
upon determining that the modified first list of educational content meets the content threshold, displaying, on the user device, the first list of educational content.

* * * * *